(12) United States Patent
Zimmer et al.

(10) Patent No.: US 10,948,109 B2
(45) Date of Patent: Mar. 16, 2021

(54) USE OF TUBING AS TEMPERATURE CONTROL TUBING

(71) Applicant: TI Automotive (Fuldabrück) GmbH, Fuldabrück (DE)

(72) Inventors: Werner Zimmer, Melsungen/Röhrenfurth (DE); Frank Fahrenholz, Kassel (DE); Siegfried Arnold, Kassel (DE); Martin Schramowski, Kassel (DE)

(73) Assignee: TI AUTOMOTIVE (FULDABRÜCK) GMBH, Fuldabrück (DE)

( * ) Notice: Subject to any disclaimer, the term of this patent is extended or adjusted under 35 U.S.C. 154(b) by 0 days.

(21) Appl. No.: 16/299,971

(22) Filed: Mar. 12, 2019

(65) Prior Publication Data
US 2019/0285203 A1    Sep. 19, 2019

(30) Foreign Application Priority Data
Mar. 13, 2018    (EP) .................................... 18161530

(51) Int. Cl.
*B32B 1/08*    (2006.01)
*F16L 11/04*    (2006.01)
(Continued)

(52) U.S. Cl.
CPC .............. *F16L 11/045* (2013.01); *B32B 1/08* (2013.01); *B32B 7/12* (2013.01); *B32B 27/08* (2013.01);
(Continued)

(58) Field of Classification Search
CPC ......... F16L 11/045; F16L 11/125; B32B 1/08; B32B 7/12; B32B 27/08; B32B 27/32; B32B 27/34; B32B 2250/24; B32B 2307/7265; B32B 2377/00; B32B 2597/00; B32B 2605/08; B32B 2307/732; B32B 2307/726; H01M 10/60; B60K 2001/003
See application file for complete search history.

(56) References Cited

U.S. PATENT DOCUMENTS

2002/0179170 A1* 12/2002 Guippe ................... B32B 27/34
                                                                 138/141
2005/0026023 A1    2/2005 Hirai et al.
(Continued)

FOREIGN PATENT DOCUMENTS

CN     102537532 A     7/2012
DE     195 35 489 C1    1/1997
(Continued)

OTHER PUBLICATIONS

International Search Report for International Application No. 18161530. 3, dated Sep. 13, 2018, 7 pgs.

*Primary Examiner* — Michael C Miggins
(74) *Attorney, Agent, or Firm* — Dickinson Wright PLLC

(57) ABSTRACT

Use of tubing as temperature control tubing in motor vehicles, wherein a temperature control medium is passed through the tubing. The tubing has the following layer structure from the outside inward:
an exterior layer of at least one polyolefin,
a first adhesive barrier,
a barrier layer of at least one polyamide,
a second adhesive barrier
and an interior layer of at least one polyolefin.
The entire wall thickness of the tubing is 0.5 to 3.5 mm.

15 Claims, 2 Drawing Sheets

(51) Int. Cl.
  *B32B 7/12* (2006.01)
  *B32B 27/08* (2006.01)
  *B32B 27/32* (2006.01)
  *B32B 27/34* (2006.01)
  *F16L 11/12* (2006.01)
  *H01M 10/60* (2014.01)
  *B60K 1/00* (2006.01)

(52) U.S. Cl.
  CPC .............. *B32B 27/32* (2013.01); *B32B 27/34* (2013.01); *F16L 11/125* (2013.01); *H01M 10/60* (2015.04); *B32B 2250/24* (2013.01); *B32B 2307/726* (2013.01); *B32B 2307/7265* (2013.01); *B32B 2307/732* (2013.01); *B32B 2377/00* (2013.01); *B32B 2597/00* (2013.01); *B32B 2605/08* (2013.01); *B60K 2001/003* (2013.01)

(56) References Cited

U.S. PATENT DOCUMENTS

2008/0023094 A1   1/2008   Sasai
2010/0166995 A1   7/2010   Sato

FOREIGN PATENT DOCUMENTS

| DE | 600 30 161 T2 | 7/2007 |
| EP | 1 031 451 A2 | 8/2000 |
| FR | 2 856 461 A1 | 12/2004 |
| JP | 2002248702 | 9/2002 |
| JP | 2005050666 | 2/2005 |
| JP | 2008-030386 | 2/2008 |
| WO | 2008093770 | 7/2008 |
| WO | WO 2012/045762 A1 | 4/2012 |

\* cited by examiner

USE OF TUBING AS TEMPERATURE CONTROL TUBING

RELATED APPLICATIONS

The present patent document claims the benefit of and priority to European Patent Application 18161530.3, filed Mar. 13, 2018, and entitled "Use Of Tubing As Temperature Control Tubing" the entire contents of which are incorporated herein by reference.

FIELD

The present disclosure relates to the use of tubing as temperature-control tubing—particularly coolant tubing—in motor vehicles, wherein a temperature control medium is passed through the tubing.—Such temperature control tubing is preferentially used in temperature control circuits of motor vehicles, wherein a temperature control medium, particularly a liquid temperature control medium, is passed through the temperature control tubing. In a particularly preferred manner, the temperature control tubing is constructed as coolant tubing and a coolant is passed through the coolant tubing as part of a coolant circuit of the motor vehicle. A particularly preferred application of the temperature control tubing according to the present disclosure is the use in temperature control systems of electric vehicles or hybrid motor vehicles having an electric motor and a combustion engine. The temperature control tubing, particularly the coolant tubing, according to the present disclosure is used there particularly for the temperature control or cooling of the battery systems.

BACKGROUND

Temperature control tubing or coolant tubing in many different designs is known from actual practice. Temperature control tubing is known especially also for controlling the temperature of motor vehicle components. However, the tubing known to date often leaves something to be desired in terms of its temperature resistance and/or its thermal insulation. If on the other hand, tubing with sufficient temperature resistance and satisfactory thermal insulation can be produced, this is often associated with a great deal of effort or material expense and thus with high costs. Also, much of the temperature control tubing known from actual practice is not mechanically resistant enough, even though such a mechanical resistance is desirable specifically in motorized vehicles.

Tubing for transporting a coolant in a motor vehicle is known from DE 600 30 161 T2. It thereby involves multi-layer tubing having an exterior layer of a vulcanized elastomer, a barrier layer or intermediate layer of polyamide and an interior layer of a vulcanized elastomer. The exterior layer and the intermediate layer as well as the intermediate layer and the interior layer are joined to each other by means of adhesive layers. This motor vehicle tubing has not proven itself and in particular the thermal insulation leaves something to be desired.

SUMMARY

The present disclosure provides a tubing which can be effectively used as temperature control tubing and fulfills all requirements particularly in regard to its thermal insulation and temperature resistance as well as mechanical strength, and can continue to be produced with little expense and low costs.

The present disclosure teaches the use of tubing as temperature control tubing—particularly as coolant tubing—in motor vehicles, wherein a temperature control medium is passed through the tubing, wherein the tubing has the following layered structure from the outside inward:

an exterior layer of at least one, preferentially one, polyolefin, a first adhesive layer, a barrier layer of at least one, preferentially one, polyamide, a second adhesive layer, an interior layer of at least one, preferentially one, polyolefin, wherein the entire wall thickness of the tubing is 0.5 to 3.5 mm, preferentially 0.5 to 3 mm and wherein the exterior layer consists of polyethylene or substantially of polyethylene or of polypropylene or substantially of polypropylene.

The temperature control tubing according to the present disclosure can be used in temperature control systems of conventional motor vehicles having a combustion engine. According to a particular design of the present disclosure, the temperature control tubing according to the present disclosure is used in temperature control systems of electric vehicles or in temperature control systems of hybrid motor vehicles having an electric motor and a combustion engine.

According to an exemplary design of the present disclosure, the tubing is used as temperature control tubing in a temperature control system for controlling the temperature or for the cooling of the battery of a motor vehicle. According to another preferred design of the present disclosure, the tubing is used as temperature control tubing of an air conditioning system of a motor vehicle.

A recommended design of the present disclosure is characterized in that the tubing is used as temperature control tubing for the temperature control or cooling of motor vehicle batteries in electric motor vehicles or in hybrid motor vehicles.

It lies within the scope of the present disclosure that a fluid medium and particularly a liquid medium is used as a temperature control medium or as a cooling medium. For practical purposes, the temperature control medium or the cooling medium involves a liquid mixture and preferably an alcohol-water mixture. A highly recommended design is characterized in that a glycol-water mixture is used as the temperature control or cooling medium.

It lies within the scope of the present disclosure that the exterior layer of the temperature control tubing according to the present disclosure consists of polyethylene or substantially of polyethylene. Preferentially, the exterior layer thereby consists of HDPE or substantially of HDPE.—According to another design of the present disclosure, the exterior layer consists of polypropylene or substantially of polypropylene and according to a design variant, said layer consists of HDPP or substantially of HDPP.

According to the present disclosure, a first adhesive layer is arranged between the exterior layer and the barrier layer. According to an exemplary design of the present disclosure, the first adhesive layer is a polyolefin- or polyamide-based bonding layer agent. A recommended design of the present disclosure is characterized in that the first adhesive layer has a polyolefin modified with a carboxylic acid derivative—particularly a maleic acid derivative—or consists of this modified polyolefin or consists substantially of it.

According to the present disclosure, a barrier layer of polyamide is arranged in the middle of the temperature control tubing or between the first adhesive layer and the second adhesive layer of the temperature control tubing. A highly recommended design of the present disclosure is characterized in that the barrier layer consists of polyamide 6 or substantially of polyamide 6. This design has especially proven itself within the scope of the present disclosure. It lies within the scope of the present disclosure that the barrier layer consists at least of a substance from the "polyamide 6, polyamide 612, polyamide 10, polyamide 11, polyamide 12, semi-aromatic polyamide, co-polyamide" group or consists substantially of it. Polyamide 6 is however preferred for the barrier layer.—It lies within the scope of the present disclosure that the barrier is constructed thicker than the first adhesive layer and/or constructed thicker than the second adhesive layer. For practical purposes, the barrier layer is at least 1.2 times, preferentially at least 1.5 times, and preferably at least 1.8 times as thick as the first adhesive layer and/or the second adhesive layer.

According to the present disclosure, the second adhesive layer is arranged between the barrier layer and the interior layer of the tubing or temperature control tubing according to the present disclosure. According to an exemplary design of the present disclosure, the second adhesive layer is a polyolefin- or a polyamide-based adhesive layer. According to a design variant of the present disclosure, the second adhesive layer is a polyolefin modified with a carboxylic acid derivative—particularly with a maleic acid derivative.

It lies within the scope of the present disclosure that the first adhesive layer and/or the second adhesive layer has a smaller thickness than the exterior layer. For practical purposes, the exterior layer is at least 1.2 times as thick, preferentially at least 1.5 times and preferably at least 2 times as thick as the first adhesive layer and/or the second adhesive layer.

According to the present disclosure, an interior layer of at least one polyolefin is provided. The interior layer thereby consists of this polyolefin or substantially of this polyolefin. A recommended design of the present disclosure is characterized in that the interior layer consists of polyethylene or substantially of polyethylene. According to a design variant, the interior layer consists of HDPE or substantially of HDPE.

Another preferred design of the present disclosure is characterized in that the interior layer consists of polypropylene or substantially of polypropylene. According to a design variant of the present disclosure, the interior layer consists of HDPP or substantially of HDPP.

It lies within the scope of the present disclosure that the interior layer is thicker than the first adhesive layer and/or thicker than the second adhesive layer. Preferentially, the interior layer is at least 1.2 times, preferably at least 1.5 times and very preferably at least 2 times thicker than the first adhesive layer and/or the second adhesive layer.

According to a very preferred design of the present disclosure, the temperature control tubing according to the present disclosure is manufactured by extrusion or coextrusion of the layers. The materials used according to the present disclosure as well as the preferred layer thicknesses of the individual layers allow for very simple and energy-saving coextrusion. One particular advantage lies in the fact that coextrusion can be performed at moderate temperatures. An exemplary design of the present disclosure is characterized in that the thickness of the exterior layer is 5 to 60%, preferentially 8 to 50% and preferably 10 to 40% of the total wall thickness of the temperature control tubing. Preferentially, the thickness of barrier layer is 5 to 50%, preferably 7 to 45% and very preferably 10 to 35% of the total wall thickness of the temperature control tubing according to the present disclosure. It is within the scope of the present disclosure that the thickness of the interior layer is 5 to 55%, preferentially 8 to 50% and preferably 10 to 40% of the total wall thickness of the temperature control tubing.

According to a recommended design of the present disclosure, the thickness of the exterior layer lies in a range between 0.1 and 1.5 mm, preferably in range between 0.2 and 1 mm. It is recommended that the thickness of the barrier layer lies in a range between 0.05 and 1 mm, preferentially in a range between 0.1 and 0.8 mm. For practical purposes, the thickness of the interior layer is 0.05 to 1.5 mm, preferentially 0.1 to 0.7 mm.—A design variant of the present disclosure is characterized in that the interior layer is configured as an electrically conductive layer and is to that end provided with conductivity additives.

As already described earlier, the temperature control tubing according to the present disclosure may be used advantageously in conventional motor vehicles having a combustion engine. A particular application field of the present disclosure lies in the fact that the temperature control tubing is to be used in electric vehicles and/or hybrid motor vehicles having an electric motor and a combustion engine. In particular electric vehicles and hybrid motor vehicles require a relatively large amount of temperature control tubing in temperature control circuits to cool or heat vehicle components. Exact temperature controlling is required here as is compliance with precise temperature limit ranges. This is surprisingly possible using the temperature control tubing according to the present disclosure since it has outstanding thermal properties, particularly optimal thermal insulation properties, as well as high temperature resistance in a relatively broad temperature range. In addition, the temperature control tubing according to the present disclosure fulfills all requirements in terms of its mechanical properties and has in particular optimal mechanical strength. Furthermore, the tubing according to the present disclosure is distinguished by high chemical resistance in relation to many fluid media as well as outstanding aging resistance. It should be emphasized that the temperature control tubing according to the present disclosure can nevertheless be designed with relatively simple measures and with relatively low material expense so that the costs for manufacturing the temperature control tubing according to the present disclosure are kept within limits. Ultimately, the temperature control tubing according to the present disclosure is characterized by optimal thermal properties, high mechanical strength as well as low manufacturing expense and low costs.

BRIEF DESCRIPTION OF THE DRAWINGS

The present disclosure is explained in greater detail below using a drawing depicting only one embodiment. Depicted in a schematic view are.

DETAILED DESCRIPTION

Figure 1:
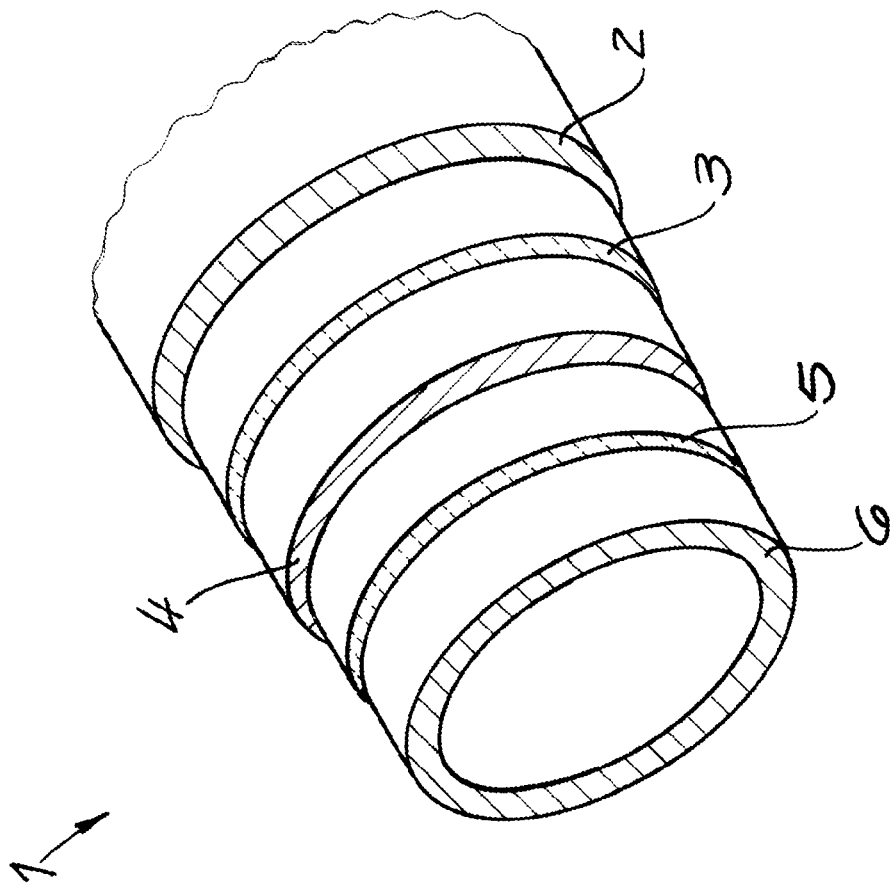
FIG. 1 a perspective view of temperature control tubing according to the present disclosure and FIG. 2 a cross-section of the subject matter according to FIG. 1.
Figure 2:
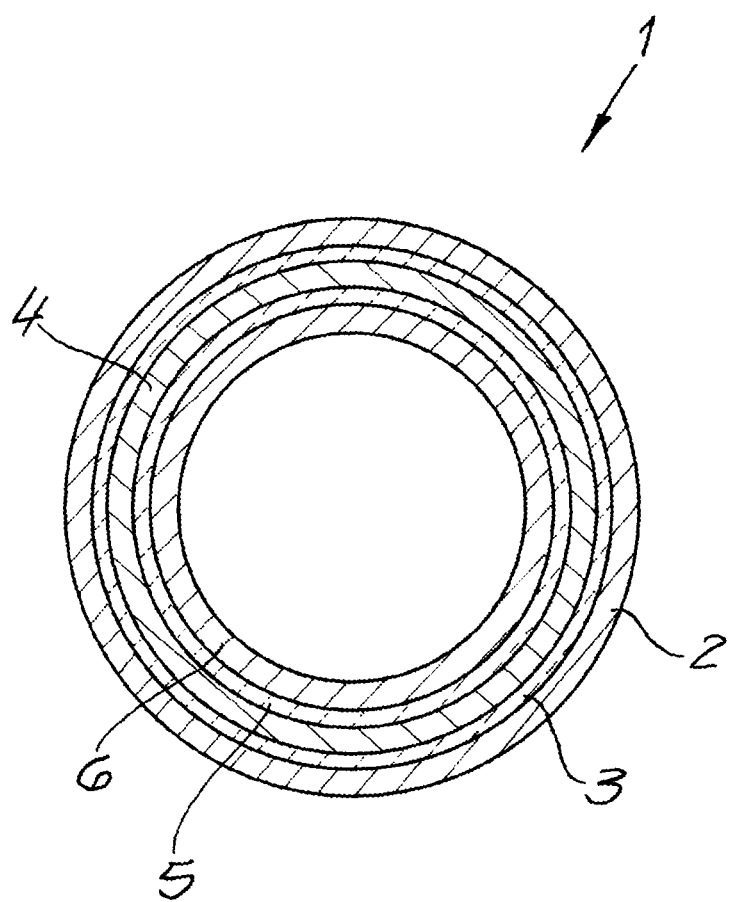

The figures depict temperature control tubing 1, which in the embodiment may be coolant tubing 1 for motor vehicles. A non-depicted cooling medium, preferably an alcohol-water mixture, is passed through this coolant tubing 1. Preferentially and in the embodiment, tubing 1 has five layers, namely from the outside to the inside: an exterior layer 2, a first adhesive layer 3, a barrier layer 4, a second adhesive layer 5 and an interior layer 6.

As recommended and in the embodiment, exterior layer 2 consists of polyethylene or substantially of polyethylene, wherein preferably HDPE is used as polyethylene.—For practical purposes and in the embodiment, first adhesive layer 3 is a polyolefin- or polyamide-based adhesive layer 3. It is thereby preferentially a modified polyolefin or polyamide.

As recommended and in the embodiment, tubing 1 has a middle layer in the form of a barrier layer 4, which in the embodiment consists of polyamide 6 or substantially of polyamide 6. Basically, barrier layer 4 may also consist at least of one substance from the "polyamide 6, polyamide 612, polyamide 10, polyamide 11, polyamide 12, semi-aromatic polyamide, co-polyamide" group or consists substantially of it.

Preferably and in the embodiment, second adhesive layer 5 arranged between barrier layer 4 and interior layer 6 is preferably a polyolefin- or polyamide-based adhesive layer 5. It may thereby involve preferentially a modified polyolefin or a modified polyamide.—For practical purposes and in the embodiment, second adhesive layer 5 is contacted by interior layer 6, which is recommended and in the embodiment consists of polyethylene or substantially of polyethylene. The polyethylene of interior layer 6 is preferably HDPE.

The total wall thickness of tubing 1 is 0.5 to 3.5 mm and preferably 0.5 to 3 mm. It is recommended that exterior layer 2 and/or barrier layer 4 and/or interior layer 6 is/are thicker than first adhesive layer 4 and thicker than second adhesive layer 5. Preferentially, exterior layer 2 and/or barrier layer 4 and/or interior layer 6 are at least 1.2 times, preferably at least 1.5 times thicker than first adhesive layer 3 and/or second adhesive layer 5.

Tubing 1 depicted in the figures may also be preferably used as temperature control tubing 1 in electric vehicles or hybrid vehicles. A recommended application of tubing 1 according to the present disclosure is controlling the temperature of the battery of an electric vehicle or hybrid vehicle during the charging procedure or prior to using the vehicle.

The invention claimed is:

1. A temperature control tubing for use in motor vehicles, wherein a temperature control medium is passed through the tubing, wherein the tubing has the following layer structure from the outside inward:

an exterior layer of at least one polyolefin;
a first adhesive layer;
a barrier layer of at least one polyamide;
a second adhesive layer; and
an interior layer of at least one polyolefin;
wherein the total wall thickness of the tubing is 0.5 to 3.5 mm, and wherein the exterior layer consists of polyethylene or substantially of polyethylene, or of polypropylene or substantially of polypropylene.

2. The tubing according to claim 1, wherein the tubing is utilized as temperature control tubing of an air-conditioning system of a motor vehicle.

3. The tubing according to claim 1, wherein the tubing is used as temperature control tubing for controlling temperature or cooling in electric or hybrid motor vehicles.

4. The tubing according to claim 1, wherein an alcohol-water mixture is used as the temperature control medium.

5. The tubing according to claim 1, wherein the exterior layer consists of HDPE or substantially of HDPE.

6. The tubing according to claim 1, wherein the first bonding agent layer is a polyolefin- or polyimide-based bonding agent layer.

7. The tubing according to claim 1, wherein the barrier layer consists at least of a substance from the "polyamide 6, polyamide 612, polyamide 10, polyamide 11, polyamide 12, semi-aromatic polyamide, co-polyamide" group or consists substantially of it.

8. The tubing according to claim 1, wherein the second adhesive layer is a polyolefin- or polyamide-based adhesive layer.

9. The tubing according to claim 1, wherein the interior layer consists of polypropylene or mainly polypropylene.

10. The tubing according to claim 1, wherein the exterior layer and/or the barrier layer and/or the interior layer is/are thicker, preferentially at least 1.5 times thicker and preferably at least 2 times thicker than the first adhesive layer and/or the second adhesive layer.

11. The tubing according to claim 1, wherein the tubing is manufactured by coextrusion.

12. The tubing according to claim 1, wherein the interior layer consists of polyethylene or substantially of polyethylene.

13. The tubing according to claim 12, wherein the interior layer consists of HDPE or substantially of HDPE.

14. Use of the tubing of claim 1 as tubing for a coolant.

15. A battery system for an electric or hybrid motor vehicle, the battery system having a battery and the tubing of claim 1 supplying coolant to the battery.

\* \* \* \* \*